United States Patent [19]
Esser et al.

[11] Patent Number: 5,662,524
[45] Date of Patent: Sep. 2, 1997

[54] DEVICE FOR THE MACHINING OF TUBE ENDS

[75] Inventors: Karl-Josef Esser; Hermann-Josef Barth, both of Mönchengladbach, Germany

[73] Assignee: Mannesmann Aktiengesellschaft, Düsseldorf, Germany

[21] Appl. No.: 546,490

[22] Filed: Oct. 20, 1995

[30] Foreign Application Priority Data

Oct. 20, 1994 [DE] Germany .................. 44 38 818.7

[51] Int. Cl.⁶ .................. B23B 3/26; B23G 5/08
[52] U.S. Cl. .................. 470/190; 72/402; 408/153; 409/191
[58] Field of Search .................. 72/186, 208, 367, 72/369, 402; 409/183, 191, 192; 408/153, 98, 158; 470/187, 190

[56] References Cited

U.S. PATENT DOCUMENTS

| | | | |
|---|---|---|---|
| 3,073,185 | 1/1963 | Hoffmann | 82/104 |
| 4,289,430 | 9/1981 | Shashaty | 408/1 R |
| 4,626,149 | 12/1986 | Holy | 409/191 |
| 5,231,859 | 8/1993 | Bailey | 72/208 |
| 5,480,271 | 1/1996 | Jorgensen et al. | 470/190 |

FOREIGN PATENT DOCUMENTS

| | | |
|---|---|---|
| 1913377 | 9/1970 | Germany . |
| 2642965 | 3/1978 | Germany . |
| 3000055 | 8/1981 | Germany . |
| 3237587 | 5/1984 | Germany . |
| 3440398 | 6/1985 | Germany . |
| 4019078 | 2/1991 | Germany . |

*Primary Examiner*—Lowell A. Larson
*Assistant Examiner*—Thomas C. Schoeffler
*Attorney, Agent, or Firm*—Cohen, Pontani, Lieberman & Pavane

[57] ABSTRACT

An apparatus for machining an end of a tube clamped within the apparatus and including a tool head rotatable about the axis of the tube, a plurality of tool holders including tools arranged about the tool head and radially moveable with respect to the axis, a plurality of push rods uniformly positioned about the tool head and axially parallel to the axis including oblique toothing positioned about one end thereof and a frame connected to the push rods and being displaceable along the axis to provide axial movement to the push rods. A transmission device including toothing for engaging the toothing on the push rods is positioned between the tool holders and push rods for imparting radial movement to the tool holders and tools connected thereto based upon axial movement of the push rods.

8 Claims, 3 Drawing Sheets

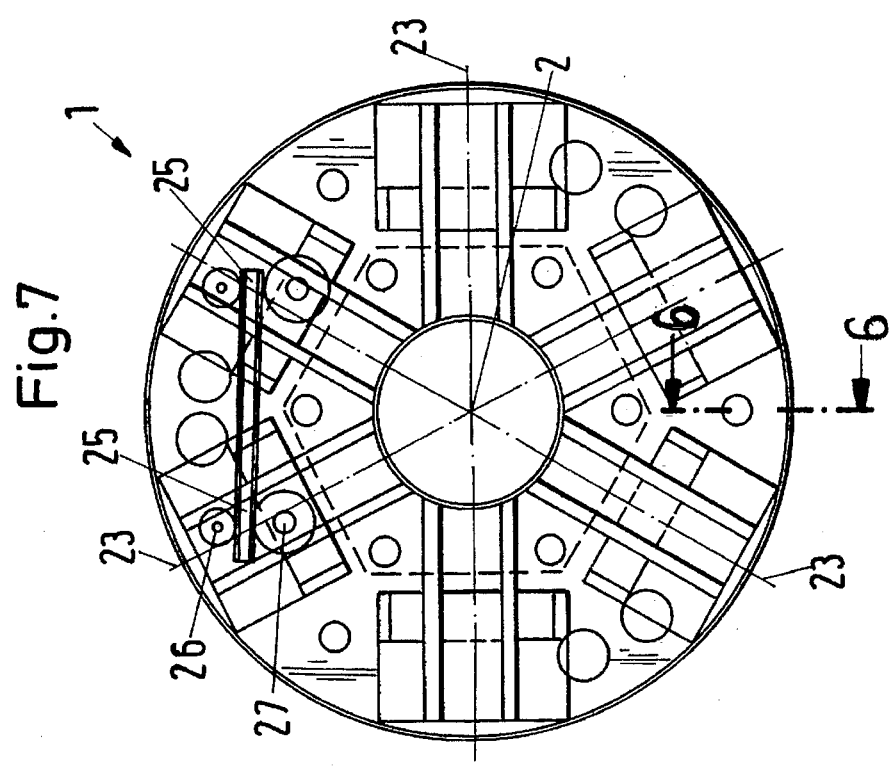
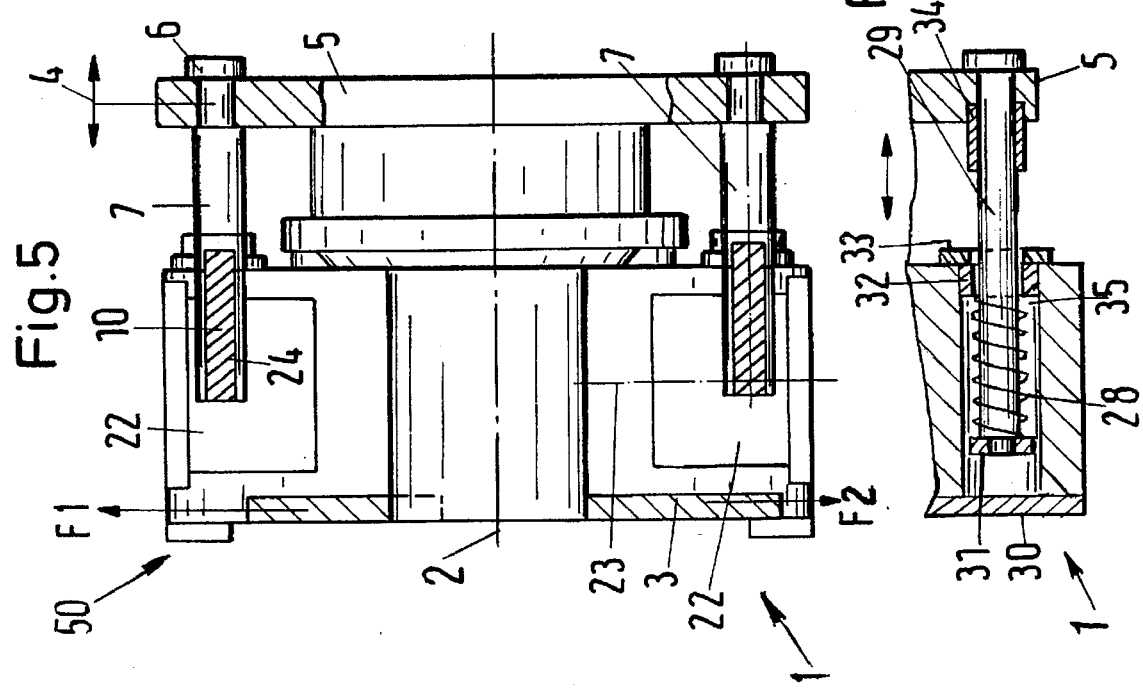

DEVICE FOR THE MACHINING OF TUBE ENDS

BACKGROUND OF THE INVENTION

1. Field of the Invention

The present invention relates to a device for machining the ends of tubes and, more particularly, to the cutting of threaded connections in the tubes, wherein the cutting tools are displaceably and adjustably arranged in a tool head radially to the tube. The tool head rotates coaxially around the firmly clamped tube end and the tools are clamped in tool holders such as slide bars. Adjustment of the tools with respect to the tube is controlled by push rods arranged in an axially parallel relationship with the tube and distributed uniformly about its circumference. The end of each push rod remote from the end of the tube is connected to a common frame which is displaceable coaxially with the axis of the tool head. The opposite end of each push rod is functionally attached to a respective transmission device by which the axially parallel infeed movement of the push rods can be converted into synchronous radial displacement of the slide bars for adjusting the cutting tools.

2. Description of the Prior Art

Thread-cutting machines which clamp a tube and include rotating tools for machining the ends of the tube, particularly cutting thread connections on, for instance, tubing and easing tubes are well-known. The tube thread is produced, as a rule, by a single pass of the tools over the end of the tube, the movements of the tools being controlled by a computer numerical control. The corresponding machines must be designed so that particularly narrow thread tolerances can be obtained. Of particular importance in these machines is the tool head in which the tools are adjustably guided against the tube. The tube is clamped in a well-defined position with respect to the machine and, after the exact position of the end of the tube has been determined, the infeed of the cutting tool is switched on. The machining tools are displaceably arranged on the tool head and uniformly distributed around its circumference. Any number of tools may be used, although in most cases six tools are provided, three of which are pre-turning tools for the machining of the cone and the other three are combined finish-turning and thread chasing tools. The tools are arranged concentrically within the rotating tool head. In each case, three tools which are 120° apart are moved in one direction and the other tools are moved in the other direction. Very high centrifugal forces act on the moving masses due to the high speeds of rotation of the tool head, e.g. 1000 rpm. These centrifugal forces counteract the infeed forces of the tools. The tools should be accurately positioned to keep the forces as small as possible.

U.S. Pat. No. 4,289,430 describes a device for the machining of a tube using only two tools. The two tools may be adjusted by push rods which are axially displaceable in parallel relation to the axis of the tool head and the workpiece under the control of a common frame with the help of a transmission device. Bevels on the tool holders serve as transmission devices for converting the longitudinal forces into transverse forces.

A disadvantage of these known devices for the machining of tube ends are that large frictional forces act on the transmission devices which are exposed to the full centrifugal forces from the rotating movement of the tool head on their bevels and oblique planes as well as on the guide paths themselves. This detrimentally affects the accuracy of the positioning of the tools and thus the manufacturing tolerances of the tube ends. Furthermore, the guides are subject to extensive wear and the device is also very costly.

SUMMARY OF THE INVENTION

It is accordingly an object of the present invention to provide a device for the machining of tube ends which is able to transmit the adjustment forces for the cutting tools from the push rods to the slide bars with the greatest possible neutrality of force relative to the acting centrifugal forces, and to produce both high output and quality machining of the tube at relatively low cost.

In order to achieve this object a device constructed in accordance with the present invention includes push rods having helical teeth in at least an end region thereof which engage corresponding teeth on a rotationally mounted transmission device.

Thus, the ends of the push rods are no longer acted on by transmission devices consisting of oblique planes and slide bar surfaces but by teeth on rotationally mounted transmission devices which permit a substantially more favorable introduction and distribution of force.

In a first embodiment of the invention, a rotatably mounted ring which coaxially surrounds the end of the tube acts as a transmission device. The ring is turned by the push rods and includes cam portion on an end facing the end of the tube which cooperate with guide elements to radially move the tool holders or slide bars upon rotation of the ring. The cam portion, which have, for instance, a helical pitch, move the tool holders containing the tools in a radial direction relative to the tube based upon the rotation of the rotatably mounted ring. The push rods control the rotation of the ring through engagement of teeth on the push rod with corresponding teeth on the outside of the ring.

If the slide bars are arranged on the tool head such that pairs of adjacent cam portion have opposing pitch directions, a reversal of movement of every second slide bar occurs when the ring is turned in one direction. It is therefore possible, if six slide bars are provided, to adjust three slide bars radially towards the tube and at the same time move three other slide bars with other tools radially away from the tube.

This construction completely compensates for centrifugal forces in the middle position of all slide bars via the ring.

The cam portion preferably extend from the end of the ring in the form of a ledge and each cam portion is movable between two pre-adjustable or pre-settable rollers which are rotatably mounted on the slide bar. Initial adjustment of the rollers allows a play-free movement of the cam portions whereby uniform and precise adjustment movements are obtained due to the equalization of forces and the mounting of the rollers and the ring.

In accordance with another variation of the present invention, helical teeth are arranged on two opposing longitudinal sides of the push rods and correspond to gear racks positioned on the opposing longitudinal sides of the push rods. The lengthwise direction of the gear racks is transverse to the push rod and in the direction of axial movement of the slide bars to which the gear racks are fastened. The longitudinal movements of the push rods are introduced directly to the gear racks which extend transverse thereto via engagement of the helical teeth on the push rods with the gear racks. The gear racks are fastened to the slide bars so that, upon longitudinal displacement of the push rods, the slide bars are moved in a transverse direction either towards or away from the tube.

If, in accordance with a further feature of the present invention, an even number of slide bars are arranged on the tool head and the gear racks of every other slide bar interact with a push rod and adjacent slide bars are connected to each other by a gear wheel. In this construction the teeth of the gear wheel simultaneously correspond with one gear rack on each slide bar. This construction also provides advantageous compensation for the centrifugal force.

In yet a further variation of the present invention cam spindles are provided as transmission devices. The spindles are each rotatably mounted on the tool head about a respective axis extending in a common plane radially to the axis of the tool head and include a cam portion which rises in a circumferential direction over at least a part of their circumference, through which the slide bars may be moved for adjustment. This construction converts the axial force of the push rods into rotational movement of the deflection device and linear movement of the slide bar in a mechanically favorable manner. The cam spindles are rotated via engagement of teeth on the circumference of the cam spindles with corresponding teeth on the push rods.

Preferably, pairs of rollers which are adjustable with respect to each other are mounted on the slide bars, the rollers of each pair engaging a cam portion between them. The cam spindles of adjacent slide bars are moveable in opposite directions of rotation by the push rods so that compensation for the centrifugal force between two adjacent oppositely traveling slide bars is compensated for by the axial push rods connected to the common frame. The ability to move and pre-adjust the rollers as radial transmission elements provides a play-free transmission of force directly benefitting the quality and capability of the apparatus of the present invention. As the centrifugal and machining forces always act in one direction on the transmission elements no reverse play of the slide bars is possible.

In accordance with yet another feature of the present invention, the tool holders are relieved, via a pre-adjustable spring system, from the differential forces generated due to the different radial positions of displacement of the tool holders, from the centrifugal forces produced by the moving parts. The forces and characteristics of the springs are adapted to the linearly behaving differential forces and their directions of action. The spring system can, in this connection, be provided to act directly on the tool holders as well as on the frame and/or the push rods.

Presently preferred embodiments of the invention are shown in the drawing and will be described below.

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

BRIEF DESCRIPTION OF THE DRAWINGS

In the drawings, in which like numerals are used to denote similar elements throughout the several views:

FIG. 5 is a side view in partial cross section of a tube-end machining device in accordance with the present invention having cam spindles and a spring equalization system;

FIG. 6 is a cross-sectional view taken along the line B—B in FIG. 7; and

FIG. 7 is a front view of the tube-end machining device of FIG. 5.

DETAILED DESCRIPTION OF THE PRESENTLY PREFERRED EMBODIMENTS

Figure 1:
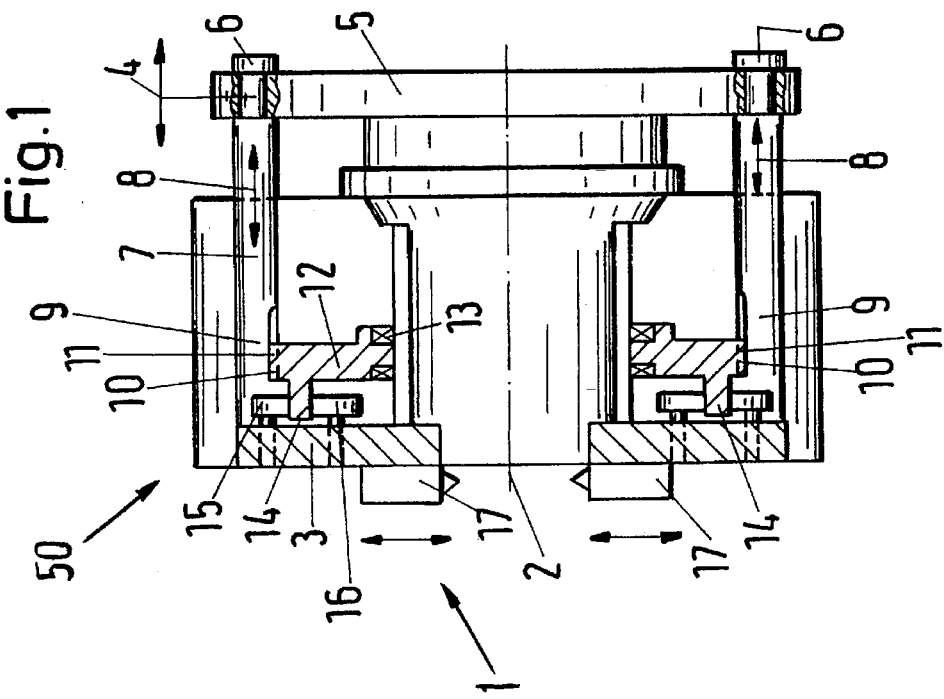
FIG. 1 is a side view in partial cross section of a tube-end machining device in accordance with the present invention having an annular transmission device provided with cam portions.

FIG. 1 illustrates a device for machining a tube in accordance with the present invention and labelled generally with the numeral 10. The device 50 includes a tool head 1 which rotates about a tool-head axis 2 and includes tool holders which may be, for example, in the form of slide bars 3 arranged uniformly about its circumference. The device 50 also includes a frame 5 which is axially displaceable along the tool head axis as indicated by the arrow labelled 4. Push rods 7 are connected to move with the frame 5 at a point labelled 6 and are simultaneously axially displaceable in synchronism in the direction of their longitudinal axis 8. The push rods 7 are each provided with helical teeth 10 on an end 9 opposite the connection with the frame 5 which engage corresponding helical teeth 11 on a ring 12 coaxially surrounding an end of a tube to be machined (not shown) and the axis 2 of the tool head 1. The ring 12 is supported by an anti-friction bearing 13.

Figure 2:
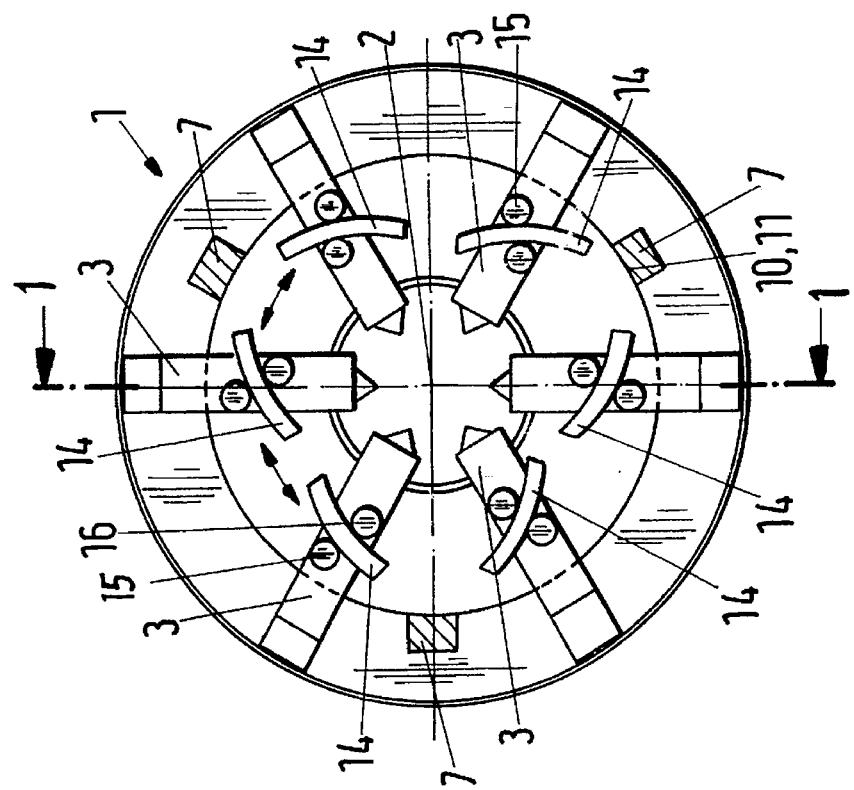
FIG. 2 is a front view of the tube-end machining device of FIG. 1.

On the left end of the ring 12, as depicted in FIG. 1, are cam portion 14 which protrude from the ring 12 in a ledge-like manner and can also be seen in FIG. 2. The cam portion 14 are positioned between respective pairs of rollers 15, 16 which are mounted to slideably engage the tool holder 3 and are adjustable for rolling without play along the cam portion 14. If the push rods 7 are moved in the longitudinal axial direction of the arrow 4 by the frame 5, the helical teeth 10 on the push rods 7 and the helical teeth 11 on the outer circumference of the ring 12 act to turn the ring 12 and the strip-shaped cam portions 14 causing the rollers 15, 16 to force the tool holders 3 to move in a radial direction either towards or away from the tube.

If adjacent cam portions 14 have opposite directions of inclination as is shown in FIG. 2, adjacent slide bars 3 and the tools 17 connected thereto will be moved in opposite directions upon the turning of the ring 12.

Figure 4:
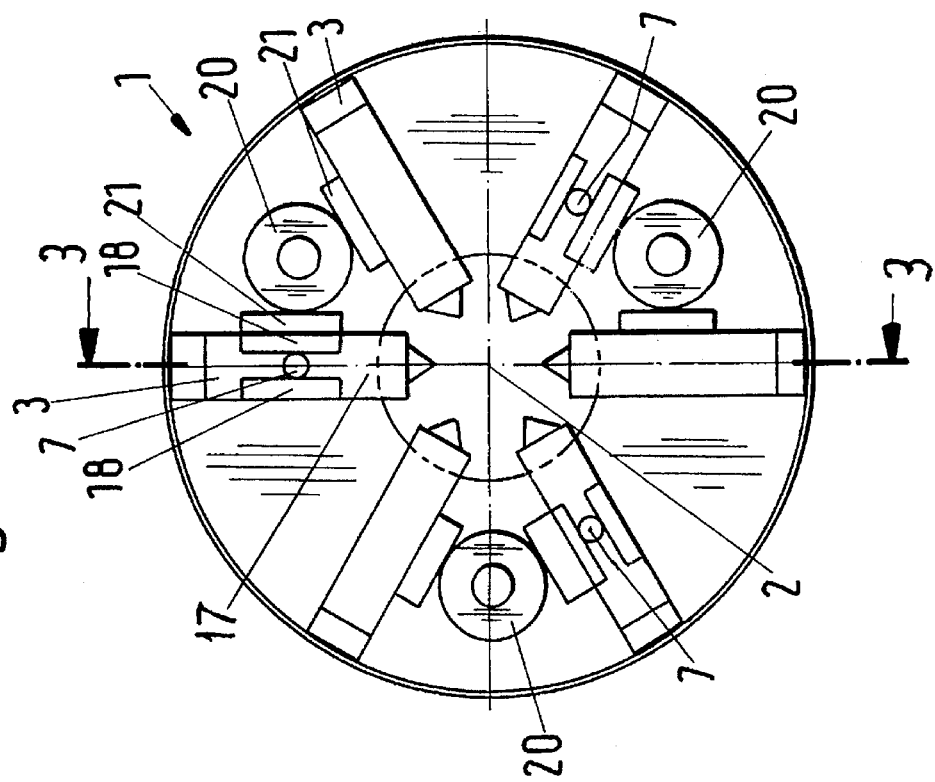
FIG. 4 is a front view of the tube-end machining device of FIG. 3.
Figure 3:
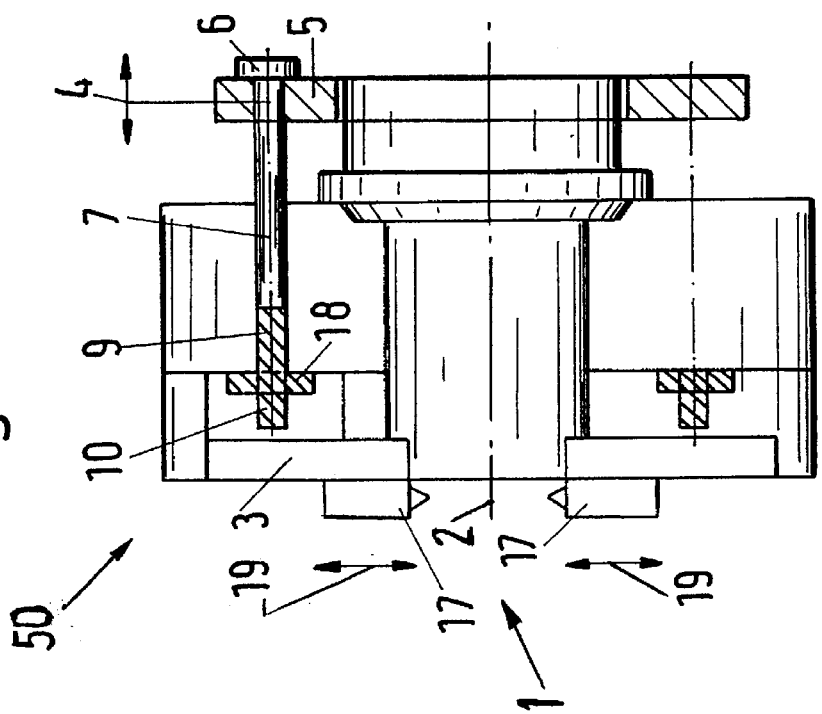
FIG. 3 is a side view in partial cross section of a tube-end machining device in accordance with the present invention having gear racks and providing centrifugal-force equalization via spur gears.

In FIGS. 3 and 4, as in FIGS. 1 and 2, the frame 5 is provided with three push rods 7 each connected to move with the frame 5 at a point labelled 6 and evenly distributed about the circumference of the tool head 1. The push rods 7 include helical teeth 10 on two opposing sides of their end regions 9 opposite the connection to the frame 5. The teeth 10 engage corresponding teeth on gear racks 18 arranged on both sides of each push rod 7. The gear racks 18 are fastened on each slide bar 3 acted on by a push rod 7. As a result of the engagement of the teeth on the push rods 7 and the gear racks 18, axial movement of the push rods 7 in the direction of the arrow 4 causes radial movement of the tools 17 connected to the slide bars 3 in the direction of the arrow 19.

To compensate the centrifugal forces, spur gears 20 are provided between pairs of adjacent slide bars 3, only every second of which being provided with gear racks 18. Each slide bar 3 is also provided with a gear rack 21 on a side between the respective pair of adjacent slide bars 3 so that the spur gears 20 mesh with gear racks 21 of the respective pair of adjacent slide bars 3. By the simultaneous engagement of the spur gears 20 with two gear racks 21 adjacent slide bars are caused to move in opposite directions, so that one slide bar moves radially towards the axis 2 of the tool head 1, while the other slide bar 3 moves radially away from the axis 2 of the tool head 1 when the push rods 7 are actuated in the direction of the arrow 4 to move along the axis 2. The entire system is designed to eliminate play of the slide bars and associated moving parts.

FIG. 5 illustrates push rods 7 provided with helical teeth 10 and engaged with helical teeth 24 provided on cam spindles 22, the cam spindles 22 serving as a transmission device and each being rotatably mounted in the tool head 1 about a respective axis of rotation 23 which extends through the respective cam spindle 22 and radial to the axis 2 of the tool head. The helical teeth 24 positioned about the cam spindles 22 correspond to the teeth 10 of the push rods 7 so that upon the movement of the push rods 7 in the direction of the arrow 4, the cam spindles 22 are each rotated about their respective radially extending axis 23. The engagement of teeth 10 and teeth 24 can be pre-adjusted by eccentrically mounting either the push rod, the cam spindle or both to compensate for machining and centrifugal forces in the same direction of stroke of the push rods 7 and thus guarantee freedom from play.

Each cam spindle 22 is provided with a cam portion 25 which extends over a part of its circumference which ascends in a circumferential direction about the cam spindle 22 and against which rollers 26 and 27, provided on either side of the cam portion 25 in pairs and adjustable with respect to each other, rest without play. These rollers slideably engage the slide bars 3 and thus effect a play-free displacement of the slide bars 3 in a radial direction with respect to the tube end (not shown) when the cam spindles 22 are placed in rotation. Based upon the degree of inclination of adjacent cam spindles 22 or an opposite arrangement of the helical teeth 24 of the push rods 7, it is possible to guide adjacent cam spindles 22 to move in different directions when the cam spindles 22 are placed in rotation by the push rods 7. Due to the play-free adjustable rollers 26, 27 and teeth 24, there exists no reversal play in the entire tool head 1.

The machining and centrifugal forces of the moving masses are converted, with little friction and step-down ratios of 1:2, into forces on the push rods 7. Based upon the arrangement of the push rods 7 within the tool head 1, adjacent and opposite push rods 7 exert opposite forces on their respective cam spindles 22, which cancel each other out due to their identical masses when the slide bars 3 are in the middle position. Thus, in this position the slightest infeed forces act on all six slide bars 3. If, upon displacement, three slide bars 3 are moved towards the outside and at the same time the other slide bars 3 are moved towards the inside, then differential forces resulting from the centrifugal forces, which have a linear ascending behavior, act on the push rods 7 and on the common frame 5. These differential forces increase the infeed forces and can thereby favor manufacturing inaccuracies of greater or lesser size depending on the stiffness of the movement transmission elements. In order to prevent this a weight equalization device as depicted in FIG. 6 is included in the device.

Weight equalization is accomplished by a pre-tensioned spring system having three springs 28 which are pre-tensioned in their directions of action in accordance with the maximum occurring differential forces. The springs 28 are arranged to be in a relaxed state when the tools 17 are in a neutral position, i.e. when all slide bars 3 are in a mid position. The tensioning of the springs 28 in a linear manner results in a simultaneous linear reduction of the differential forces.

As can be seen in FIG. 6, the springs 28 are positioned about a rod 29 which is displaceably connected to the frame 5, three rods are arranged on the tool head 1 and positioned to extend in parallel relation with the push rods 7. The rods 29 extend within respective bore holes 35 in the tool head 1 which are closed on the end opposite the frame 5 forming a stop 30 for the rod 29. Each rod 29 is provided with a collar 31 on its end adjacent the stop 30. The collar 31 abuts the spring 28. On the end of the spring 28 opposite the collar 31 is a ring 32 which is freely displaceable on the rod 29. The ring 32 is prevented from leaving the tool head 1 by a sleeve 33 fastened to the tool head 1. The inside diameter of the sleeve 33 surrounding the rod 29 is dimensioned so that a bushing 34 which is fastened on the frame 5 and pushed along the rod 29 can pass through the sleeve 33 and displace the ring 32 resting against the spring 28 whereby the spring 28 is compressed when the collar 31 of the rod 29 has reached the stop 30. On the other hand, the spring 28 is pre-tensioned in the opposite direction when the frame 5, together with the push rods 7 and the rods 29, is displaced away from the stop 30 (to the right in the drawing). The collar 31 on the rod 29 then pushes the spring 28 against the displaceable ring 32 which is limited in its displacement path by the sleeve 33. This causes the spring 28 to be pre-tensioned between the ring 32 and the collar 31. When the slide bars 3 are in a neutral position, the spring 28 is relaxed whereby one end lies with the collar 31 against the stop 30 and the other end is positioned against the ring 32 and, despite a certain initial stress, is neutral in force with respect to the frame 5.

The invention is not limited by the embodiments described above which are presented as examples only but can be modified in various ways within the scope of protection defined by the appended patent claims.

We claim:

1. An apparatus for machining an end of a tube having an axis extending therethrough comprising:

a tool head having a face side and being mounted rotatable about the axis of the tube;

a plurality of slide bars movably arranged about said face side of said tool head in a direction radial to the tube axis;

a tool connected to a respective one of said plurality of slide bars;

a plurality of push rods uniformly distributed about the tube axis and each of said plurality of push rods including a first end, a second end, and first oblique toothing positioned proximate said first end;

a frame connected to said second end of each of said plurality of push rods and being displaceable with said push rods along the tube axis; and transmission means for imparting radial movement to both said plurality of slide bars and said tools upon axial movement of said plurality of push rods, said transmission means being connected to said plurality of slide bars and including an outer surface and second oblique toothing positioned about said outer surface, said second oblique toothing corresponding to and disposed for engaging said first oblique toothing on said plurality of push rods, said transmission means comprising a rotatably mounted ring (12) having an end side facing and extending coaxially around said tube end and being turnable by said push rods (7); said ring comprising cam portions (14) on its end side facing the tube end; and guide elements connected to said slide bars (3) and cooperating with said cam portions so that said slide bars (3) are moved radially upon the turning of said ring (12).

2. The apparatus according to claim 1, wherein said tool head comprises an even number of said slide bars (3); and wherein two adjacent cam portions (14) have different directions of inclination.

3. The apparatus according to claim 1, wherein said elements include a pair of pre-tensionable rollers mounted on each of said slide bars and wherein said ring comprises a peripheral end region; said cam portion (14) are formed as ribs extending from said end region of said ring (12) and each cam portion (14) is slidably engaged between said pair of rollers (15, 16).

4. An apparatus for machining an end of a tube having an axis extending therethrough comprising:

a tool head having a face side and being mounted rotatable about the axis of the tube;

a plurality of slide bars movably arranged about said face side of said tool head in a direction radial to the tube axis;

a tool connected to a respective one of said plurality of slide bars;

a plurality of push rods uniformly distributed about the tube axis and each of said plurality of push rods including a first end, a second end, and first oblique toothing positioned proximate said first end;

a frame connected to said second end of each of said plurality of push rods and being displaceable with said push rods along the tube axis; and transmission means for imparting radial movement to both said plurality of slide bars and said tools upon axial movement of said plurality of push rods, said transmission means being connected to said plurality of slide bars and including an outer surface and second oblique toothing positioned about said outer surface, said second oblique toothing corresponding to and disposed for engaging said first oblique toothing on said plurality of push rods, said transmission means including a plurality of cam spindles, each cam spindle being rotatably mounted to said tool head and including a toothed outer side engaging said first oblique toothing of a respective one of said plurality of push rods to form a push rod-cam spindle pair; said cam spindles being rotatable about an axis of rotation extending radially from said axis; and further comprising a cam portion angularly extending from and at least partially about each of said cam spindles and engaging a respective one of said plurality of slide bars for imparting radial movement thereto.

5. The apparatus of claim 4, wherein each of said slide bars further comprises a first and second roller pair extending therefrom and slidably engaging opposing sides of a respective cam portion.

6. The apparatus according to claim 4, wherein said cam spindles (22) of adjacent slides bars (3) are rotated in opposite directions upon axial movement by said push rods (7).

7. The apparatus of claim 4, wherein at least one of said first toothing of said push rods and said second toothing of said transmission means are eccentrically mounted to provide adjustable engagement and eliminate play.

8. An apparatus for machining an end of a tube having an axis extending therethrough comprising:

a tool head having a face side and being mounted rotatable about the axis of the tube;

a plurality of slide bars movably arranged about said face side of said tool head in a direction radial to the tube axis;

a tool connected to a respective one of said plurality of slide bars;

a plurality of push rods uniformly distributed about the tube axis and each of said plurality of push rods including a first end, a second end, and first oblique toothing positioned proximate said first end;

a frame connected to said second end of each of said plurality of push rods and being displaceable with said push rods along the tube axis;

transmission means for imparting radial movement to both said plurality of slide bars and said tools upon axial movement of said plurality of push rods, said transmission means being connected to said plurality of slide bars and including an outer surface and second oblique toothing positioned about said outer surface, said second oblique toothing corresponding to and disposed for engaging said first oblique toothing on said plurality of push rods; and, at least one adjustable spring system connected to balance differential forces due to varying radial displacement of said plurality of slide bars and centrifugal forces due to rotation of said tool head.

* * * * *